United States Patent [19]

Kobayashi et al.

[11] Patent Number: 5,367,231
[45] Date of Patent: Nov. 22, 1994

[54] DISPLAY SYSTEM

[75] Inventors: Masaki Kobayashi, Machida; Rieko Kataoka, Yamato, both of Japan

[73] Assignee: International Business Machines Corporation, Armonk, N.Y.

[21] Appl. No.: 54,512

[22] Filed: Apr. 27, 1993

[30] Foreign Application Priority Data

Apr. 28, 1992 [JP] Japan .................................. 4-110324

[51] Int. Cl.$^5$ ............................................ H01J 29/52
[52] U.S. Cl. ..................................... 315/383; 348/327; 348/380
[58] Field of Search ................. 315/383; 348/327, 380

[56] References Cited

U.S. PATENT DOCUMENTS

| | | | |
|---|---|---|---|
| 4,224,640 | 9/1980 | Hovens et al. | 358/242 |
| 4,308,555 | 12/1981 | Hovens et al. | 358/243 |
| 4,514,664 | 4/1985 | Kasagi et al. | 315/383 |

Primary Examiner—Theodore M. Blum
Attorney, Agent, or Firm—David Aker

[57] ABSTRACT

The life time of a CRT is extended by decreasing the temperature of the cathode by 7-30% from the normal operating temperature and by applying a constant voltage signal to a cathode of the CRT which is shifted from a first voltage level for displaying the lowest luminance of the image toward a second voltage level for displaying the highest luminance of the image. The shift is of the order of 5-25%, so that a constant anode current in the range of 2-14 uA flows in the CRT.

6 Claims, 4 Drawing Sheets

DISPLAY DEVICE 2

DISPLAY SYSTEM

BACKGROUND OF THE INVENTION

FIELD OF THE INVENTION

This invention relates to a display system including a data processing device, such as a personal computer and a display device including a cathode ray tube (CRT).

BACKGROUND ART

Multimedia technology has recently been developed. In this technology, dynamically moving images of high contrast and high luminance must be displayed. The CRT is the best display device for displaying such images since it has rapid response time and the capability of displaying high contrast and high luminance images. However, a strong electron beam or a high anode current is required to display such images. The life time of the CRT is shortened by use of a strong electron beam. The life time is defined as the time of use until the luminance of the CRT is degraded to a predetermined level. One parameter which determines the life time is cathode emission, i.e. the capability of emitting an electron beam. The electrons are emitted from the oxide cathode by a reduction or deoxidation process occurring at the oxide cathode. The higher the degree or rate of the electron emission from the cathode or the degree of cathode emission is, the shorter is the life time of the CRT. To display a high luminance image or high load image requiring that substantially all of the dots are displayed at high luminance, a large amount of electron emission is required, so that a prior CRT of the type used for a television set or personal computer, having a life time of about 12000 hours, is not suitable for a CRT display device used with multimedia technology.

To reduce the cathode emission, it has been proposed to switch a displayed image from a normal image to an image requiring a low load at the cathode when a personal computer detects a no key-inputting operation during a predetermined time period. To this end, the personal computer has the capability of generating both the video signals of the normal image and video signals of the low load image, and supplies the video signals of the low toad image to CRT display device when it detects no key-inputting operation for the predetermined time period. However, with this approach, a normal operating voltage is applied to the heater element of the CRT, so that the cathode of the CRT is sufficiently activated for chemical reduction to occur, whereby cathode emission proceeds.

To stop the cathode emission, it has been proposed to turn the heater element off. When the voltage applied to the heater element is removed, the heater becomes cold. This approach has the following problems. It takes about 10–20 seconds to restore the heaters element to the normal operating condition. In addition a drift of convergence and a variation of color balance occurs during a transient period before the electrodes in the CRT come to a thermal equilibrium condition. The drift of convergence continues for about 20 minutes and the variation of color balance continues for about one minute. By turning the heater element off while operating voltages are applied to the remaining electrodes, such as the cathode, first grid, and second grid, the cathode enters a semiconducting state, so that the cathode in the semiconducting state is broken down under the existing electrostatic field. Undesired ions, originating from organic material in the CRT, are accelerated to the cathode, and the surface of the cathode reacts with the ions; whereby the cathode emission capability is degraded.

SUMMARY OF THE INVENTION

It is a principal object of the invention to provide a display system wherein lifetime of the display is not unduly decreased when an image of high luminance is displayed.

A display system according to the present invention comprises: a data processing means for generating video including means for detecting that no input operations have occurred and for generating a control signal representing a no input operation state when no input operations have occurred for a predetermined time; and a display means including means connected to the data processing means for responding to absence of the control signal, to amplify the video signals to generate amplified video signals which vary between a first voltage level representing the lowest luminance of an image and a second voltage level representing a highest luminance of the image, and for causing the control signal to generate a constant voltage signal at a voltage level shifted from the first voltage level toward the second voltage level, a cathode ray tube including a cathode for receiving the amplified video signals or the constant voltage signal, and voltage supply means for responding to absence of the control signal to apply a normal operating voltage to the heater element of the cathode ray tube, and for responding to the presence of the control signal to apply a voltage which is lower than the normal operating voltage.

The means connected to the data processing means comprises: an amplifier means for receiving the video signals and capable of switching gain between a normal operating gain to generate the amplified video signals which varies between the first voltage level and the second voltage level and zero gain to generate the constant voltage signal; a gain control means for responding to the absence of the control signal to switch said gain of the amplifier means to the normal operating gain, and for responding to the control signal to switch the gain of the amplifier means to zero gain; and means for responding to the control signal to shift the constant voltage signal from the first voltage level toward the second voltage level. The constant voltage signal is shifted from the first voltage by 5–25% and the voltage applied to the heater element is decreased to reduce the temperature of the cathode from its normal operating temperature by 7–30%.

A display system according to the present invention comprises a data processing means for generating blue, green and red video signals and for detecting a no key-input operation to generate a control signal representing the no key-input operation; first means connected to the data processing means to receive the blue video signals for responding to absence of the control signal to amplify the blue video signals to generate amplified blue video signals which vary between a first voltage level representing the lowest luminance of an image and a second voltage level representing the highest luminance of the image, and for responding to the control signal to generate a constant voltage blue signal at a voltage level shifted from the first voltage level toward the second voltage level; second means connected to the data processing means to receive the green video signals for responding to the absence of the control signal to amplify the green video signals to generate amplified green video signals which vary between the first voltage level and the second voltage level, and for responding to the control signal to generate a constant voltage green signal at the first voltage level; third means connected to the data processing means to receive the red video signals for responding to absence of the control signal to amplify the red video signals to generate amplified video signals which vary between the first voltage level and the second voltage level, and for responding to the control signal to generate a constant voltage red signal at the first voltage level, a cathode ray tube including three cathodes for receiving the amplified blue, green, and red video signals, respectively, or the constant voltage blue, green, and red signals, respectively; and voltage supply means for responding to absence of the control signals to apply a normal operating voltage to a heater element of the cathode ray tube, and for responding to the control signal to apply a voltage which is lower than the normal operating voltage to the heater element.

The first means comprises an amplifier means for receiving the blue video signals and capable of switching gain between a normal operating gain to generate the amplified video signals which vary between the first voltage level and the second voltage level and zero gain to generate the constant voltage signal; a gain control means for responding to absence of the control signal to switch the gain of the amplifier means to the normal operating gain, and for responding to presence of the control signal to switch the gain of the amplifier means to zero gain; and means for responding to the control signal to shift the constant voltage signal from the first voltage level toward the second voltage level. The constant voltage blue signal is shifted from the first voltage level by 5–25%, and the voltage applied to the heater element is decreased to reduce the temperature of the cathode from its normal operating temperature by 7–30%.

DETAILED DESCRIPTION OF THE PREFERRED EMBODIMENTS

The invention is based upon the discovery made by the inventors that the life time of a CRT is remarkably extended by decreasing the temperature of the cathode by 7–30% from the normal operating temperature for displaying the image, and by applying a constant voltage signal to a cathode of the CRT which is shifted from a first voltage level for displaying the lowest luminance of the image toward a second voltage level of the video signals for displaying the highest luminance of the image by 5–25%, so that a constant anode current in the range of 2–14 uA flows in the CRT.

The 5–25% represents the percentage difference of the amplitude between the first and second voltage levels. In this condition, a very light blanket color is displayed on the display surface of the CRT. This mode of the CRT is called an image display suppress mode, while the mode in which the video signals vary between the first and second voltage levels (which are applied to the cathode of the CRT) is called a normal display mode.

The decrease of the temperature of the cathode lowers the cathode emission, but it causes the undesired reaction of the ions with the cathode surface. To solve this problem a constant anode current in the range of 2–14 uA is caused to flow when the temperature of the cathode is decreased to prevent the undesired reaction at the cathode surface. It has been experimentally found that the life time of the CRT is extended to 40000–44000 hours in the above temperature and current ranges. Particularly, in the case when the decrease of the cathode temperature is 10% and the value of the constant anode current is 9–10 uA, the life time of the CRT is extended to 44000 hours.

Figure 1:
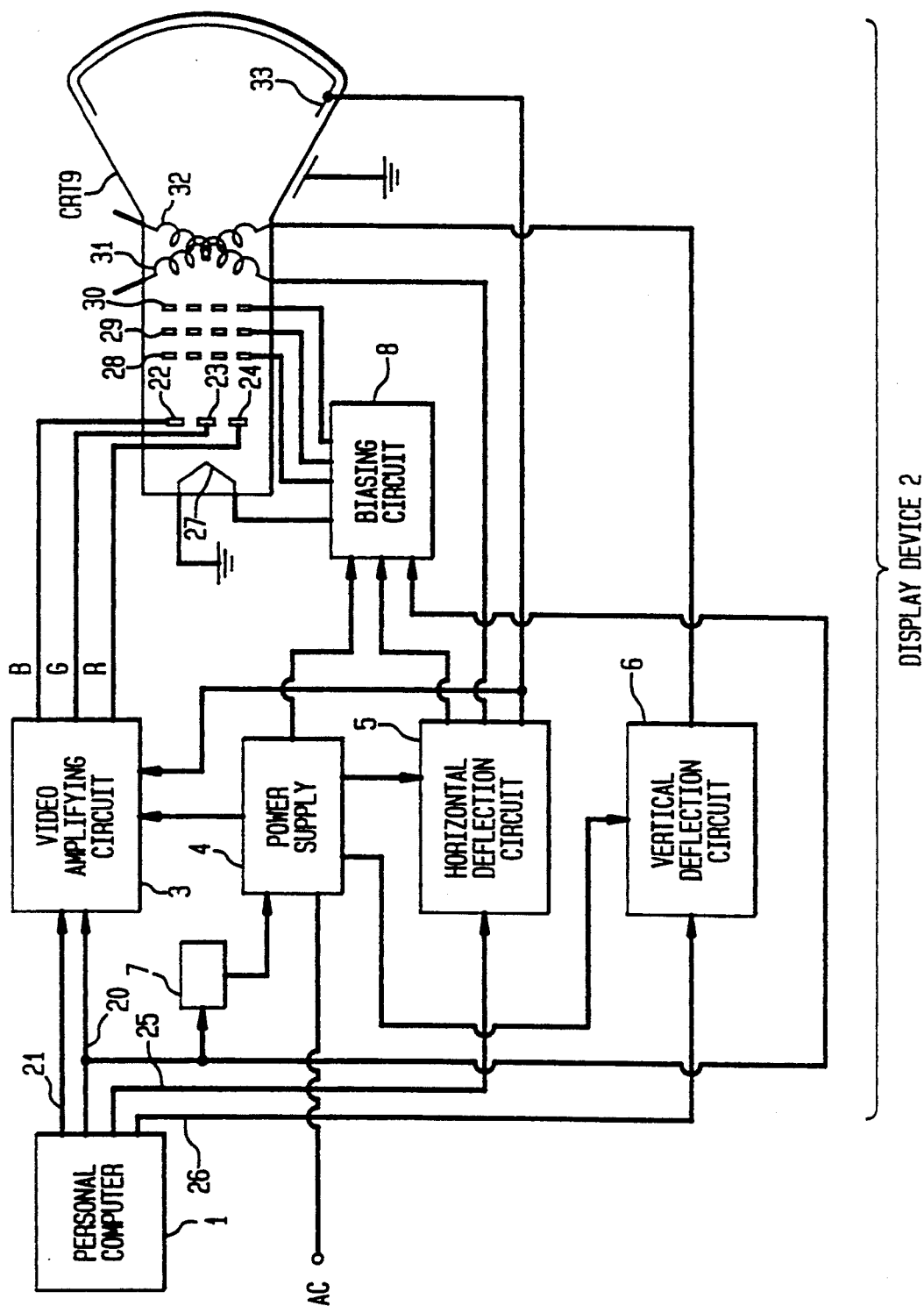
FIG. 1 is a block diagram of a display device in accordance with the present invention.

Referring to FIG. 1, a display device 2 is connected to a data processing device, such as a personal computer 1. The display device 2 includes a video amplifying circuit 3, a power supply circuit 4, a horizontal deflection circuit 5, a vertical deflection circuit 6, a timer circuit 7, a biasing circuit 8 and a CRT 9.

The power supply circuit 4, the horizontal deflection circuit 5, the vertical deflection circuit 6 and the CRT 9 are circuits well known in the art.

The power supply circuit 4 receives AC voltage and supplies various voltages to the circuits of the display device 2. The horizontal deflection circuit 5 receives horizontal synchronization pulses from the personal computer 1 through a line 25, and controls horizontal deflection operation of the CRT 9. The vertical deflection circuit 6 receives vertical synchronization pulses from the personal computer 1 through a line 26, and controls vertical deflection operation of the CRT 9. The CRT 9 includes a heater element 27, a cathode 22 receiving blue (B) video signal, a cathode 23 receiving green (G) video signal, a cathode 24 receiving red (R) video signal, a first grid 28 suppressing the electrons and a second grid 29 accelerating the electrons, a focus grid 30 for operating to focus the electron beam, a horizontal deflection coil 31, a vertical deflection coil 32 and a metal back 33.

The video amplifying circuit 3, amplifies the blue, green and red video signals received from the personal computer 1 via a line 21, and supplies the three color video signals to the cathodes 22, 23 and 24, respectively, in a normal display mode in which characters or images from the personal computer 1 are displayed on the display surface of the CRT 9. The video amplifying circuit 3 performs the operation of the present invention described hereinafter in response to the control signal indicating the no key-input operation during a predetermined time period supplied from the personal computer 1.

Figure 2:
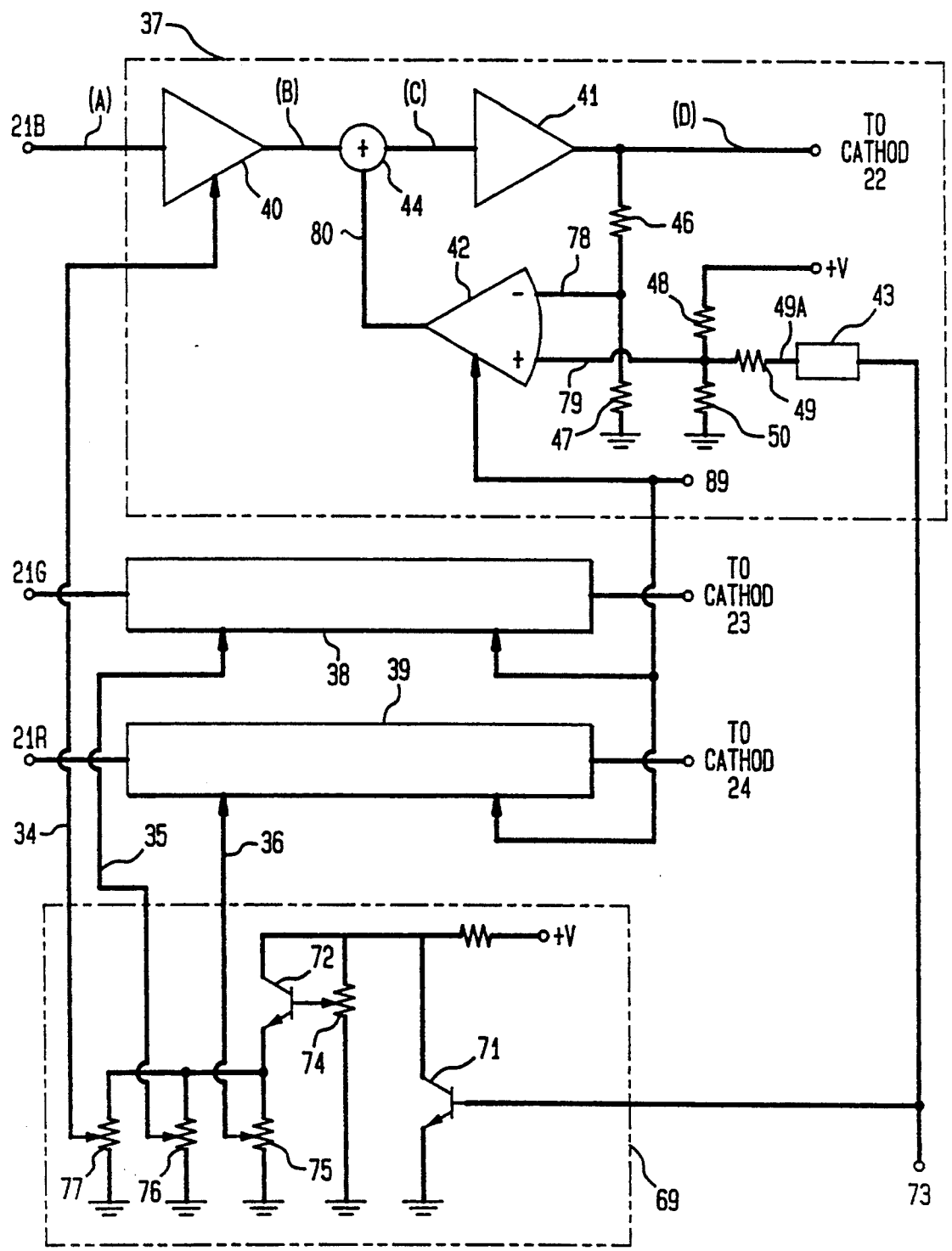
FIG. 2 is a schematic diagram of a video amplifying circuit in accordance with the present invention.

The detailed circuit configuration of the video amplifying circuit 3 for performing the operation in accordance with the present invention is shown in FIG. 2. A block 37 receives the blue video signal from the personal computer 1 at an input terminal 21B. Block 37 includes a pre-amplifier 40, an adder circuit 44, a main amplifier 41, a differential amplifier 42, an open collector circuit 43 and resistors 46, 47, 48, 49 and 50. An output, i.e. the blue video signal, of the main amplifier 41 is supplied to the cathode 22 of the CRT 9. The blocks 38 and 39 have the same circuit configuration as that of the block 37, except that the blocks 38 and 39 do not include the open collector circuit 43 and the end 49A of the resistor 49 is connected to the reference level. The block 38 amplifies the green video signal and supplies it to the cathode 23 of the CRT 9, and the block 39 amplifies the red video signal and supplies it to the cathode 24 of the CRT 9.

The waveforms 61-68 at the nodes (A), (B), (C) and (D) in FIG. 2 are shown in FIG. 3A, FIG. 3B, FIG. 3C and FIG. 3D respectively. The waveforms 61, 62, 63 and 64 are the waveforms in the normal display mode for displaying the characters or image on the display surface of the CRT 9. The video amplifying circuit 3 also includes a gain control circuit 69 and an input terminal 73.

Gain control voltages on lines 34, 35 and 36 are controlled by the gain control circuit 69 in response to the control signal supplied from the personal computer 1, indicating that there is no input operation during a predetermined time period such as, for example 30 minutes. Usually an input operation means that a key on a keyboard associated with personal computer 1 has been pressed to provide input to the personal computer. However, more generally, the input may take many forms, such as that from a touch screen, a light pen, a handwriting pad or any other input device. The control signal is supplied to the input terminal 73 through a line 20 in FIG. 1. That is, the personal computer has a timer which measures the time period and generates a signal of low level when it detects continuous input operations (by an operator) and generates a control signal of high level when it detects no input operations during the predetermined time period. When the control signal of low level is supplied to the input terminal 73, a transistor 71 is turned off, so that a collector to a transistor 71 is maintained at a positive voltage.

In this state, a contrast control voltage divider 74, a voltage divider 75 for adjusting the red color, a voltage divider 76 for adjusting the green color and a voltage divider 77 for adjusting the blue color are adjustable, whereby the gain control voltages on the lines 34, 35 and 36 are supplied to the pre-amplifier 40 in the blocks 37, 38 and 39, respectively. The pre-amplifiers 40 in the block 37, 38 and 39 amplify the video signal 61 received at the input terminals 21B, 21G and 21R to generate the wave form 62 shown in FIG. 3B.

The circuit in block 37 (including the differential amplifier 42 and the open collector circuit 43) generates a voltage V1 (FIG. 3C) on a line 80 in response to the control signal of low level applied to the input terminal 73 during a clamp signal at a terminal 89 generated by the horizontal deflection circuit 5 during the horizontal retrace period. The circuit of block 37 also generates a voltage V2 which is higher than the voltage v1 on line 80 in response to the control signal of high level. More particularly, when the control signal of low level indicating that the operator is continuing key-input operations is applied to the input terminal 73, the end 49A of the resistor 49 is connected to the reference voltage or ground potential by the open collector circuit 43.

Figure 4:
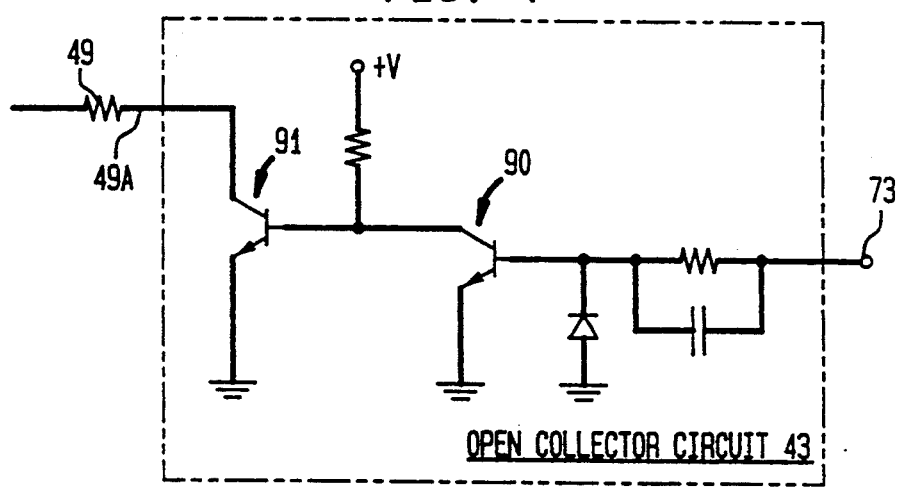
FIG. 4 is a schematic diagram of the open collector circuit of FIG. 2.

The circuit configuration of the open collector circuit 43 is shown in FIG. 4. When a control signal of low level is applied to the input terminal 73, a transistor 90 is turned off, and a transistor 91 is turned on, so that the line 49A is connected to the reference voltage. When a control signal of high level is applied to the input terminal 73, transistor 90 is turned on, and the transistor 91 is turned off; that is a base current does not flow through the base and the emitter of the transistor 91, so that the voltage on line 49A or the collector of transistor 91 is free to float.

Since the line 49A is connected to the reference voltage in the normal display mode, the voltage level on a line 79 (FIG. 2) is determined by resistors 48, 49 and 50 and a positive voltage +V. The differential amplifier 42 generates the voltage V1 shown in FIG. 3 in response to the difference between the voltage on the lines 78 and 79.

The biasing circuit 8 (FIG. 1) receives a voltage from the power supply 4 and the horizontal deflection circuit 5 to generate various voltages for the heater element 27, and the first, second and focus grids 28, 29 and 30.

Figure 5:
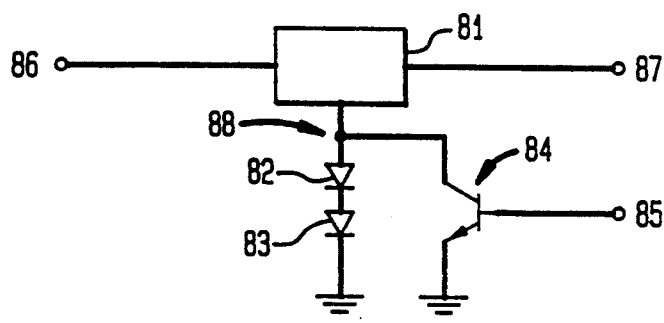
FIG. 5 is a schematic diagram of the circuit for controlling the heater voltage.

Since the preferred embodiment of the invention applies one of two voltage levels to the heater element 27 in response to the level of the control signal, a portion of the biasing circuit 8 for generating the heater voltage is shown in FIG. 5. The circuit includes a voltage regulator 81, diodes 82 and 83 and a transistor 84. The voltage regulator 81 generates a higher voltage than a voltage at a connecting node 88 by a predetermined voltage, such as 5V.

Figure 6A:
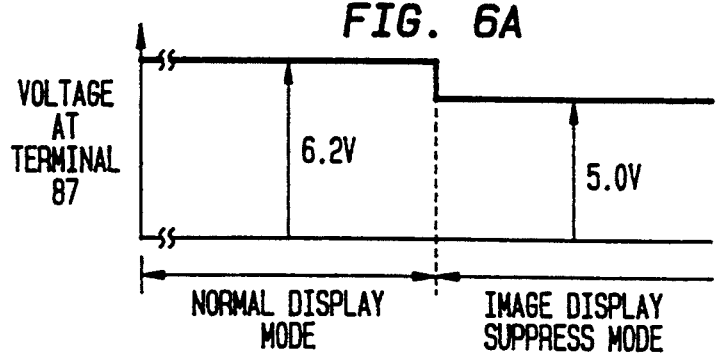
FIG. 6A and FIG. 6B illustrate switching of a heater voltage between a normal display mode and an image display suppress mode.
Figure 6B:
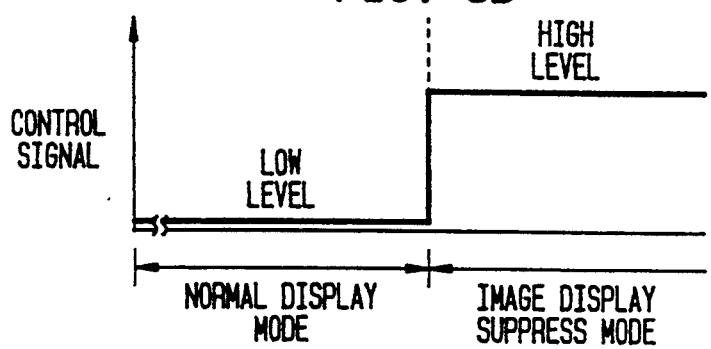

The voltage on the node 88 is switched between two levels, such as 0V and 1.2V in response to the level of the control signal applied to an input terminal 85. A voltage drop across the diodes 82 and 83 is 1.2V. When the level of the control signal is low, the transistor 84 is turned off, so that the voltage on node 88 is at 1.2V, whereby the voltage regulator 81 generates a heater voltage of 6.2V on the output terminal 87, as shown in FIG. 6. The heater voltage of 6.2V fully activates the heater element 27 of the CRT9, shown in FIG. 1, so that the temperature of the cathodes 22, 23, and 24 is maintained at the normal operating temperature, such as 1100 degrees K, and the CRT9 is operated in the normal display mode.

When the level of the control signal is high, the transistor 84 is turned on, so that the voltage on node 88 is at 0V, whereby the voltage regulator 81 generates a heater voltage of 5.0V on the output terminal 87, as shown in the FIG. 6. By decreasing the heater voltage to 5.0V, the temperature of the cathodes 22, 23 and 24 is decreased to 1000 degrees K. That is, the temperature of the cathodes 22, 23 and 24 is decreased from the normal operating temperature by 9%.

Figure 3A:
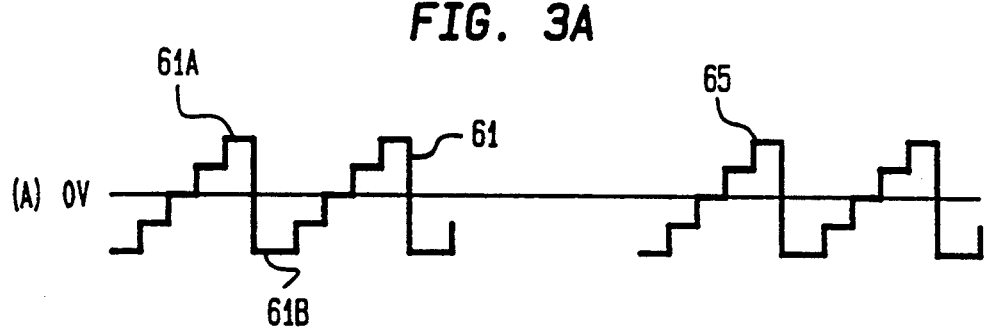
FIG. 3A to FIG. 3D illustrate the waveforms at the various nodes in the video amplifying circuit of FIG. 2.
Figure 3B:
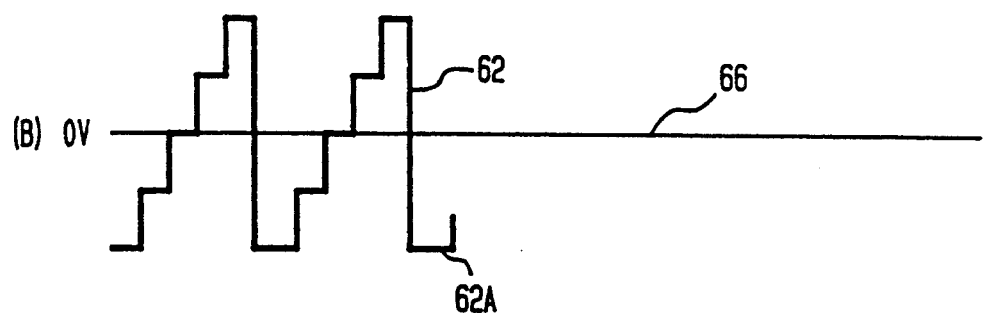

Describing the operation of the circuit shown in FIG. 2 in the normal display mode with reference to the waveforms 61, 62 63 and 64, in which the control signal of low level is supplied from the personal computer 1 to the display device 2 through the line 20, the gain of the pre-amplifiers 40 of the blocks 37, 38 and 39 is maintained at the normal operating gain, and the heater voltage is maintained at the normal operating voltage, i.e. 6.2V, so that the temperature of the cathodes 22, 23 and 24 is maintained at the normal operating temperature, i.e. 1100 degrees K, and the differential amplifier 42 generates the lower voltage V1. The personal computer 1 supplies three kinds of video signals, i.e. the blue video signals, green video signals and red video signals, to the video amplifying circuit 3 via the line 21. The blocks 37, 38, 39 receive the blue, green and red video signals, respectively. The blue video signals represented by the waveform 61 in FIG. 3A is supplied to the pre-amplifier 40 of block 37. The voltage level 61A is a voltage level representing the highest luminance of the blue image and the voltage level 61B is a voltage level representing the lowest luminance of the blue image.

Figure 3C:
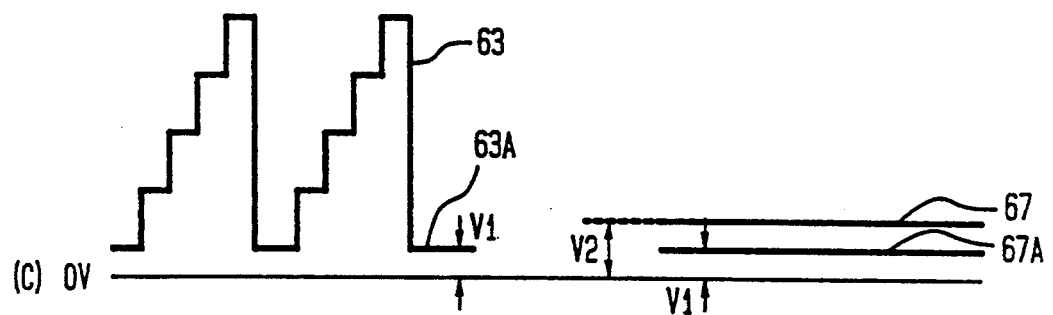
Figure 3D:
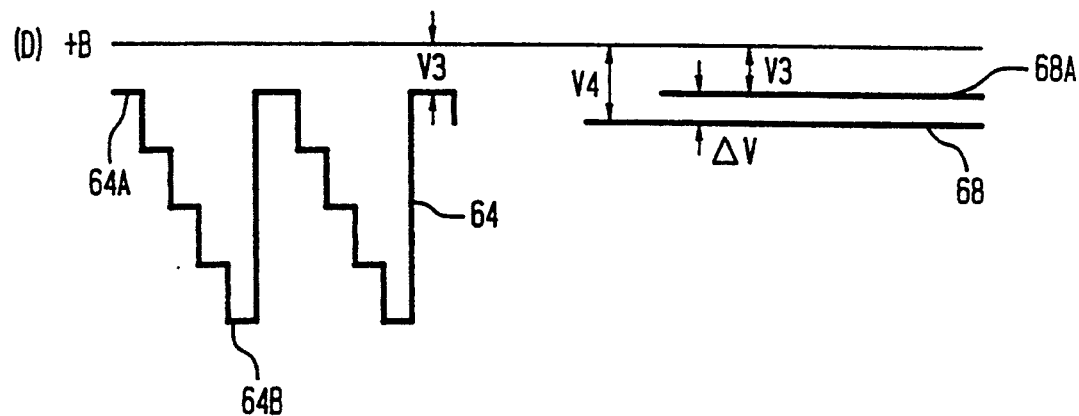

The pre-amplifier 40 amplifies the waveform 61 to generate the waveform 62, the lowest voltage level 62A of which is clamped at the voltage V1 by the adding circuit 44, as shown in FIG. 3C. The main amplifier 41 amplifies the waveform 63 to generate the waveform 64 with the polarity being reversed. That is, the main amplifier 41 inverts and amplifies the waveform 63, so that the voltage V1 between the reference voltage of 0V and the lowest voltage level 63A representing the lowest luminance of the image is amplified to the voltage V3 between the reference voltage +B, e.g. +70V, and the voltage level 64A, e.g. 65V, representing the lowest luminance of the image, and the amplitude of the waveform 63 is amplified to the amplitude of the waveform 64 between the voltage level 64A and the voltage level 64B, e.g. 25V. The waveform 64 is supplied to the cathode 22 of the CRT 9 of FIG. 1. When the voltage level 64A is applied to the cathode 22, no electrons are emitted from the cathode 22, so that no blue image is displayed on the display surface of the CRT 9. This is called the lowest luminance of the image. When the voltage level 64B is applied to the cathode 22, the cathode fully emits electrons, so that a blue image of the highest luminance is displayed. The same operation as above is performed by the blocks 38 and 39, whereby the color image is displayed on the display surface of the CRT 9.

Next, describing the operation during the image display suppress mode in accordance with the present invention, when the control signal of high level is supplied from the personal computer 1 to the display device 2 through the line 20, the gain of the pre-amplifiers 40 in blocks 37, 38 and 39 is decreased to zero level, and the heater voltage is decreased to 5.0V, so that the temperature of the cathodes 22, 23 and 24 is decreased to 1000 degrees K, and the output voltage of the differential amplifier 42 is increased to V2, while the differential amplifiers 42 in the blocks 38 and 39 generate the voltage V1, respectively. Therefore, the pre-amplifiers 40 in all the blocks 37, 38 and 39 receive the blue, green and red video signals, as shown by the waveform 65 in FIG. 3, and generate an output signal of a constant level of zero amplitude (0V), as shown by waveform 66.

It is noted that block 37 has the function of switching the output voltage of the differential amplifier 42 to the voltage V2 in the image display suppress mode, but the blocks 38 and 39 do not have the above switching function, that is, the differential amplifier 42 in the blocks 38 and 39 generate the voltage V1 in both the normal display mode and image display suppress mode. Therefore, waveform 66 in block 37 is clamped to voltage V2, as shown by the waveform 67, while waveforms 66 in blocks 38 and 39 are clamped to the voltage V1, as shown by waveform 67A. Waveform 67, representing the blue signal, is supplied to the main amplifier 41 in block 37, which amplifies the voltage V2 between the reference voltage 0V and the voltage level of waveform 67 to the voltage V4 between the reference voltage level +B and waveform 68. The waveform 67A, representing the green or red signal, is supplied to the main amplifier 41 in blocks 38 and 39, which amplifies the voltage V1 to the voltage V3.

The waveform 68 of the blue image is applied to the cathode 22 of the CRT9 and the waveforms 68A of the green and the red images are applied to the cathodes 23 and 24, respectively.

It is noted that the voltage level of the waveform 68 of the blue image is shifted from the voltage levels of the waveforms 68A of the green and red images by the voltage ΔV, that is the constant voltage level of the waveform 68 of the blue image is shifted by the voltage ΔV from the voltage level of the waveform 68A representing the lowest luminance of the image towards the voltage level 62B representing the highest luminance of the image.

When the waveforms 68A of the green and red images are applied to the cathodes 23 and 24 of the CRT 9, respectively, no electrons are emitted from cathodes 23 and 24, so that no green and red images are displayed. When the waveform 68 of the blue image is applied to the cathode 22 of the CRT 9, a small number of electrons are emitted from the cathode 22, so that a weak electron beam represented by a weak anode current in the range of 2-14 uA flows in the CRT, whereby a very light blanket blue color is displayed on the display surface of the CRT 9.

In this manner, in the image display suppress mode, the temperature of the cathodes 22, 23 and 24 of the CRT 9 is decreased from the normal operating temperature, e.g. 1100 degrees K, by 7-30%, and the constant voltage level of the blue signal is shifted from the voltage level representing the lowest luminance of the blue image by 5-25%, whereby a weak electron beam represented by an anode current in the range of 2-14 uA flows in the CRT9 to display the very light blanket blue color. As described above, the decrease of the temperature of the cathode lowers the cathode emission, but it causes the undesired reaction of the ions with the cathode surface. To eliminate the undesired reaction at the cathode, a constant anode current or electron beam of 2-14 uA is caused to flow.

The reason for selecting the cathode 22 for the color blue is that the degree to which blue stimulates the human eyes is relatively low.

As described above, the display device 2 switches its operational mode between the normal display mode and the image display suppress mode in response to the level of the control signal.

Further, the timer circuit 7 shown in FIG. 1 is provided to detect a lapse of a predetermined time period, for example, one hour after the receipt of the control signal of high level on line 20 to turn the power supply circuit 4 off. If the level of the control signal is restored to the low level during the predetermined time period, the timer circuit 7 is reset. The purpose of the timer circuit 7 is to turn all the circuits in the display device 2 off in the following situation. That is, sometimes, the operator tends to forget to turn the display device 2 off when he/she finishes office work or he/she leaves his desk for a long period of time. Due to the operation of timer circuit 7, the cathode emission if stopped, and power is saved.

Thus as described herein, the present invention extends the life time of a CRT to 40000-44000 hours.

What is claimed is:

1. A display system comprising:
    a data processing means including means for generating video signals and means for detecting absence of input signals from an input device to said data processing means and for generating a control signal representing said absence of input signals, when no input signal has occurred for a predetermined time; and a display means including:

signal processing means connected to said data processing means for responding to absence of said control signal to amplify said video signals to generate amplified video signals which vary between a first voltage level representing a lowest luminance of an image and a second voltage level representing a highest luminance of said image, and for responding to said control signal to generate a constant voltage signal at a voltage level shifted from said first voltage level toward said second voltage level, a cathode ray tube including at least one cathode for receiving said amplified video signals or said constant voltage signal, and voltage supply means for responding to absence of said control signal to apply a normal operating voltage to a heater element of said cathode ray tube, and for responding to presence of a said control signal to apply a voltage lower than said normal operating voltage.

2. A display system according to claim 1, wherein said signal processing means comprises:

an amplifier means for receiving said video signals, said amplifier means having a normal operating gain to generate said amplified video signals and a zero gain to generate said constant voltage signal;

a gain control means for responding to absence of said control signal to switch said gain of said amplifier means to said normal operating gain, and for responding to presence of said control signal to switch said gain of said amplifier means to said zero gain; and shifting means responsive to said control signal for shifting said constant voltage signal from said first voltage level toward said second voltage level.

3. A display system according to claim 1, wherein said constant voltage signal is shifted from said first voltage level by 5-25% and said voltage applied to said heater element is decreased to reduce temperature of said cathode from normal operation temperature by 7-30%.

4. A display system comprising:

a data processing means including a generating means for generating blue, green and red video signals and a detecting means for detecting absence of input signals from an input device to said data processing means and for generating a control signal representing said absence of input signals when no input signal has occurred for a predetermined time;

first means connected to said data processing means to receive said blue video signals and responsive to absence of said control signal to amplify said blue video signals to generate amplified blue video signals which vary between a first voltage level representing a lowest luminance of an image and a second voltage level representing a highest luminance of said image, and for responding to presence of said control signal to generate a constant voltage blue signal at a voltage shifted from said first voltage level toward said second voltage level, second means connected to said data processing means to receive said green video signals and responsive to absence of said control signal to amplify said green video signals to generate amplified green video signals which vary between said first voltage level and said second voltage level, and for responding to presence of said control signal to generate a constant voltage green signal at said first voltage level, third means connected to said data processing means to receive said red video signals and responsive to absence of said control signal to amplify said red video signals to generate amplified red video signals which vary between said first voltage level and said second voltage level, and for responding to presence of said control signal to generate a constant voltage red signal at said first voltage level, a cathode ray tube including three cathodes for receiving said amplified blue, green and red video signals, respectively or said constant voltage blue, green and red signals, respectively, and voltage supply means for responding to absence of said control signal to apply a normal operating voltage to a heater element of said cathode ray tube, and for responding to presence of said control signal to apply a voltage lower than said normal operating voltage to said heater element.

5. A display system according to claim 4, wherein said first means comprises:

an amplifier means for receiving said blue video signals, said amplifier means having a normal operating gain to generate said amplified video signals and a zero gain to generate said constant voltage signal;

a gain control means for responding to absence of said control signal to switch said gain of said amplifier means to said normal operating gain, and for responding to presence of said control signal to switch said gain of said amplifier means to zero gain, and shifting means responsive to said control signal for shifting said constant voltage signal from said first voltage level toward said second voltage level.

6. A display system according to claim 4, wherein said constant voltage blue signal is shifted from said first voltage level by 5-25%, and said voltage applied to said heater element is decreased to reduce temperature of said cathode from normal operating temperature by 7-30%.

* * * * *